(12) United States Patent
Marui

(10) Patent No.: US 9,446,808 B2
(45) Date of Patent: Sep. 20, 2016

(54) BICYCLE SADDLE

(71) Applicant: MARUI CO., LTD., Hyogo (JP)

(72) Inventor: Kouhei Marui, Hyogo (JP)

(73) Assignee: Marui Co., Ltd., Hyogo (JP)

( * ) Notice: Subject to any disclaimer, the term of this patent is extended or adjusted under 35 U.S.C. 154(b) by 0 days.

(21) Appl. No.: 14/417,844

(22) PCT Filed: Jul. 24, 2013

(86) PCT No.: PCT/JP2013/004513
§ 371 (c)(1),
(2) Date: Jan. 28, 2015

(87) PCT Pub. No.: WO2014/061179
PCT Pub. Date: Apr. 24, 2014

(65) Prior Publication Data
US 2015/0210333 A1   Jul. 30, 2015

(30) Foreign Application Priority Data

Oct. 17, 2012 (JP) .................... 2012-230375

(51) Int. Cl.
*B62J 1/08* (2006.01)
*B62J 1/00* (2006.01)
*B62J 1/02* (2006.01)

(52) U.S. Cl.
CPC *B62J 1/08* (2013.01); *B62J 1/002* (2013.01); *B62J 1/02* (2013.01)

(58) Field of Classification Search
CPC ............... B62J 1/08; B62J 1/02; B62J 1/002
USPC .................... 297/195.1, 202, 214, 215.16
See application file for complete search history.

(56) References Cited

U.S. PATENT DOCUMENTS 4,451,083 A * 5/1984 Marchello ................. B62J 1/20
  297/195.1 X
5,911,473 A * 6/1999 Hill ........................... B62J 1/04
  297/195.1 X (Continued)

FOREIGN PATENT DOCUMENTS

JP  8-253180 A  10/1996
JP  2000-16364 A  1/2000

(Continued)

OTHER PUBLICATIONS

International Search Report, PCT/JP2013/004513, Oct. 22, 2013.

*Primary Examiner* — Anthony D Barfield
(74) *Attorney, Agent, or Firm* — Ogilvie Law Firm

(57) ABSTRACT

Provided is a bicycle saddle wherein the seat is made from a resin base alone without using a shock-absorbing pad and the conflicting properties of softness/comfort and strength/rigidity can be balanced. The saddle comprises a main saddle body and a rail member for mounting the main saddle body on a frame. The main saddle body is configured from a frame member made of a first synthetic resin in which multiple through holes are formed, and a mesh member made of a second synthetic resin that is laminated on the upper surface of the frame member and in which multiple through holes are formed in a mesh pattern. The second synthetic resin of the mesh member is selected from nylon, polyethylene and polypropylene. The first synthetic resin of the frame member is a synthetic resin such as a glass fiber-reinforced synthetic resin with a higher rigidity than the second synthetic resin.

19 Claims, 10 Drawing Sheets

(56) References Cited

U.S. PATENT DOCUMENTS

| | | |
|---|---|---|
| 6,957,857 B1 | 10/2005 | Lee |
| 7,059,674 B2 | 6/2006 | Garland et al. |
| D591,066 S | 4/2009 | Chao et al. |
| 7,547,064 B2 | 6/2009 | Garneau |
| D692,245 S | 10/2013 | Attey |
| 2004/0004374 A1 | 1/2004 | Garland |
| 2004/0004375 A1 | 1/2004 | Garland |
| 2005/0121951 A1 | 6/2005 | Yu |
| 2007/0246978 A1 | 10/2007 | Yu |
| 2007/0273184 A1 | 11/2007 | Garneau |
| 2008/0018147 A1 | 1/2008 | Ybarrola |
| 2010/0237668 A1 | 9/2010 | Tseng |
| 2012/0242119 A1 | 9/2012 | Bigolin |
| 2014/0028064 A1 | 1/2014 | Truglio |

FOREIGN PATENT DOCUMENTS

| | | |
|---|---|---|
| JP | 2004-217201 A | 8/2004 |
| JP | 2006-7958 A | 1/2006 |
| JP | 3128329 U | 1/2007 |
| JP | 2007-512159 A | 5/2007 |
| JP | 2011-143734 A | 7/2011 |

* cited by examiner (1)

(2)

(1)

(2)

(1)

(2)

BICYCLE SADDLE

TECHNICAL FIELD

The present invention relates to a bicycle saddle and, in particular, relates to technologies improving the flexibility and comfort of a saddle in which a seat is free of a shock-absorbing pad such as urethane foam and made of only a resin base.

BACKGROUND ART

A well-known conventional bicycle saddle is such that a saddle main body is constituted with a base member composed of a hard synthetic resin material, a cushion sheet composed of urethane or the like high in flexibility which is laminated on an upper face thereof, and an exterior sheet which is laminated on the upper face of the cushion sheet to cover the base member in its entirety. (For example, see Patent literature 1)

Since the base member is injection-molded from a hard synthetic resin material high in rigidity so as to stably support the load of a rider, it is poor in flexibility and makes the buttocks sore etc., when the rider takes a ride, thereby posing a problem in terms of comfort. Thus, the cushion sheet high in flexibility is overlaid on an upper face of the base member to impart appropriate cushioning properties, thereby improving comfort.

However, in the case of the above-described bicycle saddle, the cushion sheet is covered with an exterior sheet which is thin and soft for attaining cushioning properties. Therefore, the cushion sheet is easily broken and comes out of the surface when, for example, a bicycle falls down, which poses a problem. Further, where the exterior sheet is broken off or not sufficiently water-proofed, rainwater easily seeps into the saddle on a rainy day, which also poses a problem. Still further, there is a problem that a saddle main body cannot be washed as it is.

Under these circumstances, there has been proposed a bicycle saddle which is made of a synthetic-resin base member having many through holes so that a saddle main body is able to undergo elastic deformation according to a change in load. (See Patent literature 2, 3)

In the above-described bicycle saddle, many through holes are formed so that the base member is able to easily undergo elastic deformation. Therefore, when the load of a rider is applied thereto, the base member receives the load, while slowly undergoing elastic deformation. As a result, use of only the base member is able to give appropriate cushioning properties to the saddle main body. Unlike a conventional case, it is not necessary to laminate a cushion sheet on an upper face of the base member, and when the bicycle saddle gets wet on a rainy day, rainwater on the base member can be wiped off to easily remove water. Thus, there is no discomfort due to rainwater seeping out from the cushion sheet when a rider takes a ride, as found in a conventional bicycle saddle. Further, the through holes formed on the base member are used to adjust cushioning properties of individual parts of the base member by combining a position of a through hole formed, a size, a shape, the number of the through holes, etc.

However, since the base member is formed with a single synthetic resin material, it has been difficult to balance contrasting elements such as flexibility/comfort and strength/rigidity only by combining a position of a through hole formed, a size, a shape, the number of the through holes, etc.

Therefore, a bicycle saddle disclosed in Patent Document 3 is provided with a flexible shock-absorbing material which is overlaid on the surface of a base member and able to quickly conform to the shape of the buttocks of a rider, softly receive the force acting on the buttocks by alleviating the force, thereby improving the flexibility/comfort.

Further, the bicycle saddle of Patent Document 3 is provided with a rigidity adjustor which is overlaid on the surface of the base member or filled into a through hole of the base member, thereby increasing the structural strength of the base member to improve the strength/rigidity of a saddle main body.

More specifically, the shock-absorbing material and the rigidity adjustor are provided as a seat which is overlaid on the base member in its entirety or in part or as a pad which is filled into a through hole of the base member.

PRIOR ART

[Patent literature 1] JP1996-253180A
[Patent literature 2] JP2004-217201A
[Patent literature 3] JP2006-7958A

OUTLINE OF THE INVENTION

Problems to be Solved by the Invention

As described above, where the base member is formed with a single synthetic resin material, it has been difficult to balance the flexibility/comfort with the strength/rigidity only in combination of a position of the through hole formed, a size, a shape, and the number of the through holes, etc.

Further, it is in reality very difficult to balance the flexibility/comfort with the strength/rigidity by using the shock-absorbing material and the rigidity adjustor which are overlaid on the surface of the base member or filled into the through holes formed on the base member.

In view of the above-described situation, an object of the present invention is to provide a bicycle saddle which has a seat made of only a resin base without using a shock-absorbing pad and is able to balance contrasting elements such as flexibility/comfort and strength/rigidity.

Means to Solve the Objects

The present inventor has tried to design a bicycle saddle which has a seat made of only a resin base without using a shock-absorbing pad by dividing the seat into a part which is in contact with the buttocks and required for flexibility and a part which suppresses sagging of the saddle and is required for strength.

In the design tried as described above, a hard material is arranged on a frame portion which is not directly in contact with the buttocks when a rider takes a ride, thereby suppressing undesirable deformation such as sagging and irregular shape of the saddle. And, a soft material is arranged on a part which is in contact with the buttocks to realize a soft and comfortable riding sensation. A resin material used at the "flexibility-required part" and that used at the "strength-required part" are categorized into resin materials different in rigidity, thereby attaining an aim to realize both of the flexibility/comfort and strength/rigidity at such a high level that has not yet been achieved only by designing the shape of a saddle main body.

That is, the bicycle saddle of the present invention is provided with a saddle main body and a rail member which attaches the saddle main body to a bicycle frame, and the saddle main body is constituted with (1) and (2) given below.
(1) Frame member made of a first synthetic resin on which a plurality of through holes are formed, and
(2) Mesh member made of a second synthetic resin which is laminated on an upper face of the frame member and on which a plurality of through holes are formed in a mesh-like manner.

According to the above-described constitution, the saddle main body is such that a seat can be made of only a resin base without using a shock-absorbing pad, thereby balancing contrasting elements such as flexibility/comfort and strength/rigidity.

The above-described frame member is a part which suppresses an undesirable deformation such as sagging and irregular shape of the saddle main body and a part which is required for strength. The frame member is a part which corresponds to a "frame" of a shell-like saddle in its entirety excluding a rail. Further, the mesh member is a part in contact with the buttocks of a rider and a part which is required for flexibility. It is a hammock-like part of the shell-like saddle in its entirety which is stretched on the frame excluding the rail.

Still further, the rail member is formed with a hardwire such as metal and a part which is fixed with respect to a sheet pillar.

Here, the second synthetic resin of the mesh member is a synthetic resin lower in rigidity than the first synthetic resin of the frame member. More specifically, the second synthetic resin of the mesh member is a synthetic resin selected from nylon, polyethylene, polypropylene and polycarbonate. The first synthetic resin of the frame member is a synthetic resin obtained by reinforcing the second synthetic resin with glass fiber or carbon fiber.

The following combinations are available, for example, the first synthetic resin which is glass fiber-reinforced nylon is combined with the second synthetic resin which is not fiber-reinforced nylon, and the first synthetic resin which is carbon reinforced nylon is combined with the second synthetic resin which is polycarbonate.

Regarding the first synthetic resin of the frame member and the second synthetic resin of the mesh member, it is acceptable that the first synthetic resin is provided with strength/rigidity and the second synthetic resin is a synthetic resin lower in rigidity than the first synthetic resin. It is acceptable that, for example, the first synthetic resin which is nylon is combined with the second synthetic resin which is polyethylene.

As described above, the frame member and the mesh member are integrally formed with resin materials different in hardness, that is, a resin material higher in strength/rigidity and a resin material which is flexible are integrally formed by use of insert molding technologies.

Insert molding is generally known as a molding method in which a resin is injected into the vicinity of a metal component inserted into a mold to integrate the metal with the resin. The bicycle saddle of the present invention is made of resin materials different in hardness, that is, after a primary molded article which has been previously formed is inserted into a mold, a resin material different in hardness is injected into the vicinity thereof to provide a saddle main body which is an integrally molded article.

Further, it is desirable that an opening area of individual through holes formed on the frame member of the bicycle saddle in the present invention is substantially equal to or larger than an opening area of individual through holes formed on the mesh member. The frame member is formed with a resin material higher in rigidity, therefore, if the individual through holes formed on the frame member are increased in opening area, these through holes can be prevented from deformation of the shape such as sagging and irregular shape. The individual through holes formed on the frame member are increased in size, thus making it possible to realize improvement in breathability and reduction in weight.

Further, the frame member of the bicycle saddle in the present invention is constituted with a rear seat portion and a long and narrow front-end portion which protrudes forward from the rear seat portion. Next, a pair of through holes on both sides of the rear seat portion and a through hole substantially at the center of the front end portion are greater in opening area by 3 times or more than other through holes. Further, the through holes are to be formed at a total area of 50% or more of the frame member. Thereby, it is possible to realize improvement in breathability and reduction in weight.

Here, it is preferable that an opening area of the through holes on the frame member is 50% or more of a total area, and it is more preferable that the opening area is from 60% to 70% of the total area. This will realize further reduction in weight. In order to retain the strength/rigidity of the frame member, the bicycle saddle is designed so that the opening area of the through holes will not exceed 70% of the total area. Further, an area of through holes on the mesh member is to be from 30% to 50% of the total area. The area is to be 30% or more, thereby improving breathability. Still further, the bicycle saddle is designed so that the area will not exceed 50%, thus making it possible to support stably the load of a rider and also prevent mud splashed up from the ground from being stuck to clothing of a rider.

The two through holes on both sides of the rear seat portion are positioned at sites which are most frequently in contact with the fleshy part of the buttocks. Large through holes are provided at these sites, thereby supporting most of the fleshy part of the buttocks only by the mesh member high in flexibility. The mesh member high in flexibility supports the fleshy part of the buttocks in a hammock-like fashion. Therefore, the mesh member is able to quickly conform to the shape of the buttocks, thus making it possible to cushion the force acting on the buttocks, softly receive the force and improve the flexibility/comfort to a greater extent.

Further, the through hole substantially at the center of the front end portion is positioned at a site which is in contact with the delicate part of a rider. A large through hole is provided at this site, thereby supporting the delicate part only by the mesh member high in flexibility. The mesh member high in flexibility supports the delicate part in a hammock-like fashion, thus making it possible to cushion the force acting on the delicate part, softly receive the force and improve the flexibility/comfort to a greater extent.

Further, each of the frame member and the mesh member of the bicycle saddle in the present invention is constituted with a rear seat portion and a long and narrow front end portion protruding forward from the rear seat portion, and formed in an arch-like shape which gives a slow curve toward an outer circumference so as to be recessed at the center of the rear seat portion, with each of the outer circumferences being substantially the same.

As described above, the frame member and the mesh member are substantially similar in outer-circumference shape and entire shape, thus making it possible to impart flexibility to all the parts which are in contact with the buttocks of a rider.

Further, in the bicycle saddle of the present invention, it is preferable that the first synthetic resin of the frame member is different in color from the second synthetic resin of the mesh member. Thereby, the saddle main body can be designed in an increased number of variations to attract the buying intention of consumers.

Further, each of the rail member of the bicycle saddle in the present invention is a hard wire-like member that is fitted into leg pieces consecutively installed at a front end and a rear end of the frame member. It is preferable that a recessed part of the leg piece is made of a flexible material with shock absorption.

A layer made of a flexible material is formed at a part where the rail member is fitted into the frame member, thereby improving the shock absorption.

It is preferable that the frame member is a molded article which is made of at least two types of synthetic resin materials different in hardness or the mesh member is a molded article which is made of at least two types of synthetic resin materials different in hardness.

Further, it is acceptable that the frame member is a molded article which is made of at least two types of synthetic resin materials different in hardness and also the mesh member is a molded article which is made of at least two types of synthetic resin materials different in hardness.

The frame member is a molded article which is made of at least two types of synthetic resin materials different in hardness. Thereby, a resin material depending on the rigidity required by each site of the frame member can be used to retain the strength/rigidity so as to stably support the load of a rider who takes a ride and also to impart the flexibility/comfort to the rider.

Further, the mesh member is a molded article which is made of at least two types of synthetic resin materials different in hardness. Thereby, a resin material depending on the flexibility required by each site of the mesh member can be used to retain the strength/rigidity so as to stably support the load of a rider who takes a ride and also to impart the flexibility/comfort to the rider.

In the above-described bicycle saddle, that is, in the bicycle saddle in which the frame member is a molded article which is made of at least two types of synthetic resin materials different in hardness or the mesh member is a molded article which is made of at least two types of synthetic resin materials different in hardness, it is preferable that the synthetic resin materials different in hardness are different in color from each other.

Thereby, the saddle main body can be designed in an increased number of variations to attract the buying intention of consumers.

Effects of the Invention

According to the bicycle saddle of the present invention, there are provided such effects that the seat is made of only a resin base without using a shock-absorbing pad, thereby balancing contrasting elements such as flexibility/comfort and strength/rigidity.

Further, according to the bicycle saddle of the present invention, there are provided such effects that the seat is made of only a resin base without using a shock-absorbing pad, by which no water soaks into the bicycle saddle when exposed to rain, the saddle main body can be washed as it is, and the bicycle saddle is excellent in resistance and breathability, resistant to wear and tear and also high in weather ability such as resistance to ultraviolet radiation.

Still further, according to the bicycle saddle of the present invention, there are provided such effects that the frame member and the mesh member are integrally formed respectively with a resin material high in strength/rigidity and a resin material with flexibility by use of insert molding technologies, by which the saddle main body can be greatly reduced in manufacturing time and cost and the saddle main body can be reduced in weight, with an outer appearance thereof given a unique design.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
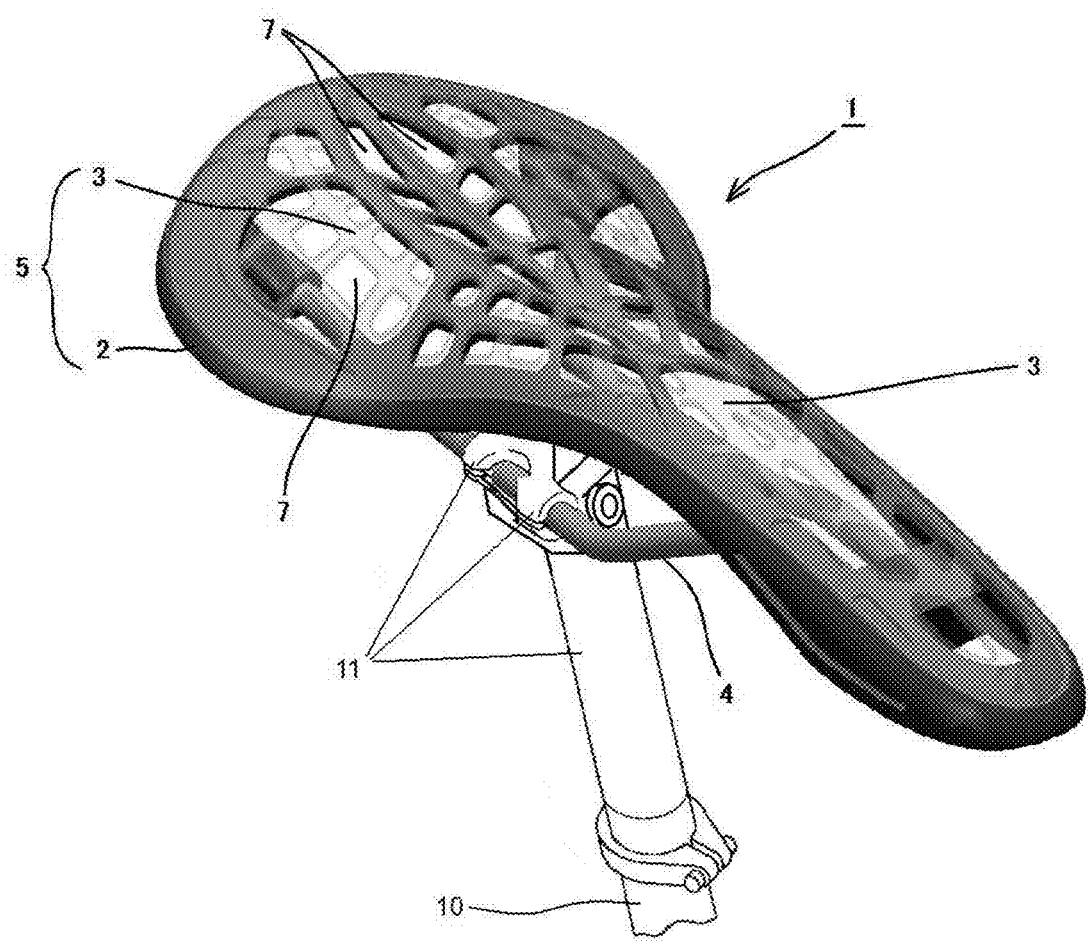
FIG. 1 shows an external perspective view of the bicycle saddle of Embodiment 1.

FIG. 1 shows an external perspective view of the bicycle saddle of Embodiment 1. A bicycle saddle of Embodiment 1 which is mainly used for a racing bicycle is a bicycle saddle 1 which is provided with a long and narrow end portion at the front so as to cope with a shift in the center of gravity or a change in riding posture of a rider who participates in a race. That is, an entire shape of the bicycle saddle 1 shown in FIG. 1 is composed of a substantially oval-shaped rear seat portion and a long and narrow front end portion projecting forward from the rear seat portion.

The bicycle saddle 1 shown in FIG. 1 is constituted with a saddle main body 5 composed of a frame member 2 formed with a hard synthetic resin material and a mesh member 3 formed with a synthetic resin material softer than the resin material of the frame member 2, and a pair of rail members 4 which are attachment members attaching the saddle main body 5 to a bicycle frame 10.

More specifically, the frame member 2 is made of glass-fiber reinforced nylon and the mesh member 3 is made of nylon not fiber-reinforced. The glass-fiber reinforced nylon is greater in shore hardness than the nylon not fiber-reinforced.

Figure 2:
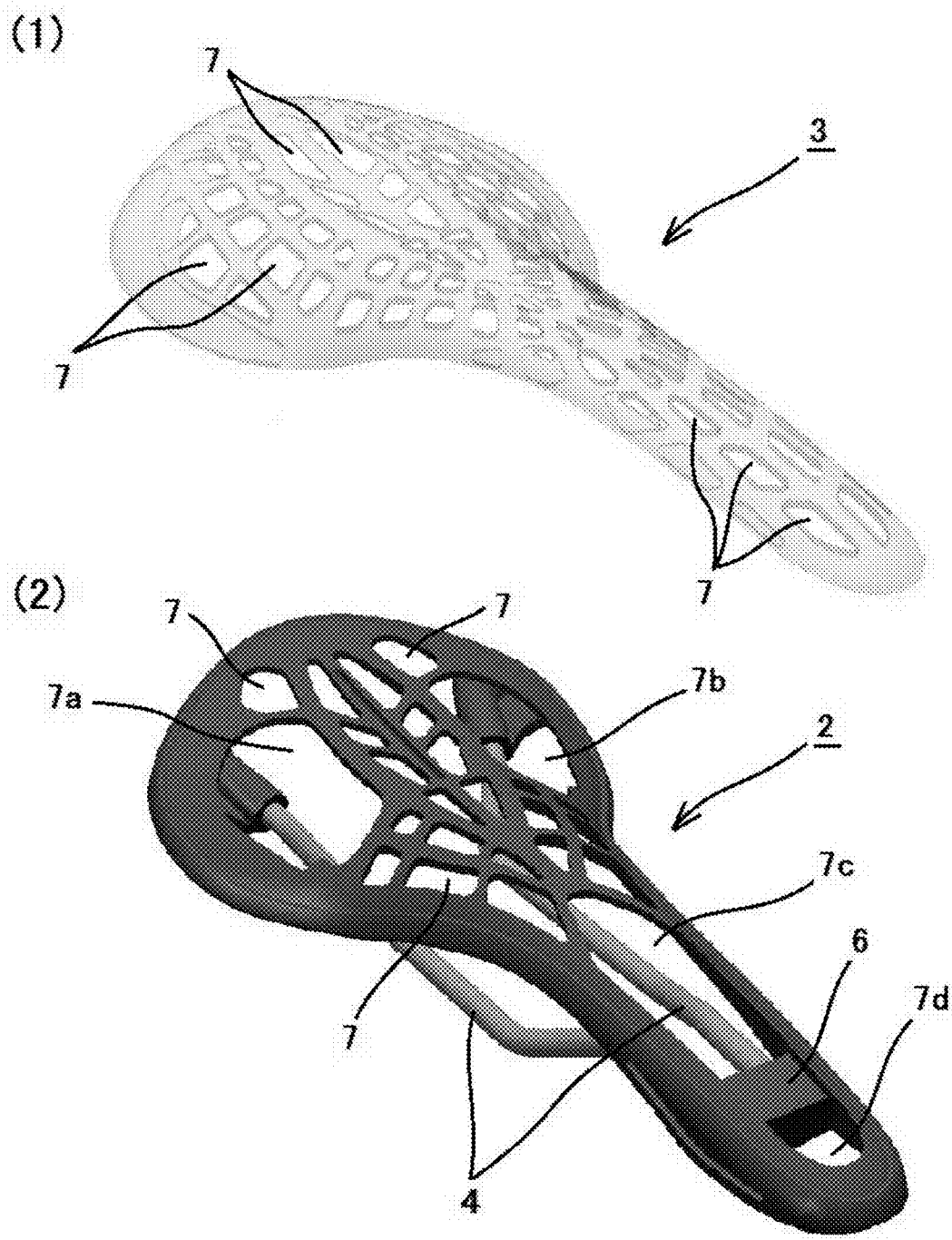
FIG. 2 shows an explanatory view of the structure of the frame member and the mesh member of the bicycle saddle of Embodiment 1, (1) mesh member, (2) frame member.

Each of the frame member 2 and the mesh member 3 is provided with a plurality of through holes 7. However, as will be described hereinafter, each of the through holes of the members is substantially different in terms of arrangement, shape and size. As shown in FIG. 2(1), the through holes 7 of the mesh member 3 are arranged almost all over a region so as to be symmetrical in a mesh-like fashion. On the other hand, as shown in FIG. 2(2), most of the through holes of the frame member 2 are greater in opening area than the through holes of the mesh member 3. In particular, the through holes (7a, 7b, 7c) are greater in opening area by 3 to 4 times than the through holes of the mesh member 3. The through holes of the frame member 2 are, as with those of the mesh member 3, arranged almost all over a region so as to be symmetrical. The through holes (7c, 7d) formed at the front end portion are one symmetrical hole.

Figure 3:
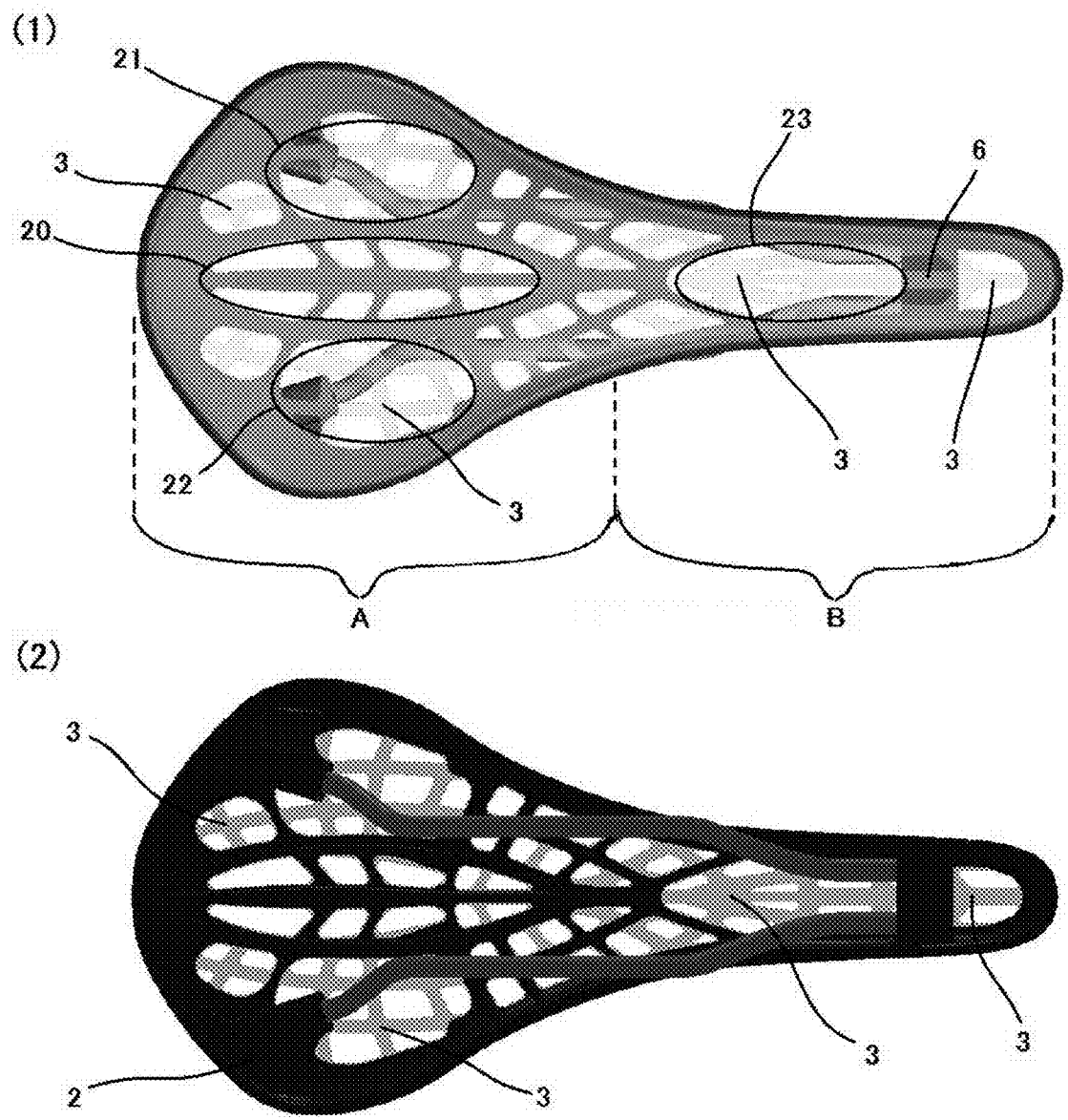
FIG. 3 shows a structure view of the bicycle saddle of Embodiment 1, (1) plan view, (2) bottom view.

As shown in FIG. 3, each of the frame member and the mesh member of the bicycle saddle in Embodiment 1 is composed of a rear seat portion A and a long and narrow front end portion B protruding forward from the rear seat portion. Next, the frame member is provided with a pair of through holes (21, 22) on both sides of the rear seat portion A and a through hole 23 at the center of the front end portion B. These three through holes (21, 22 and 23) are greater in opening area by 3 to 4 times than other through holes. Further, the through holes are formed at a region accounting for 60% to 70% of a total area of the frame member.

Regarding the through holes of the mesh member 3, rectangular through holes different in size are arrayed at the rear seat portion A so as to be concentric in a radial manner from the center of the rear seat portion, thereby forming a spider's web-like mesh structure. Further, long holes are formed at the front end portion B so as to be placed side by side in the longitudinal direction.

The two through holes (21, 22) on both sides of the rear seat portion A are positioned at sites most frequently in contact with the fleshy part of the buttocks of a rider. The large through holes (21, 22) are formed at the sites, thus making it possible to support most of the fleshy part of the buttocks only by the mesh member 3 high in flexibility. The mesh member 3 high in flexibility supports the fleshy part of the buttocks in a hammock-like fashion, by which the mesh member is able to quickly conform to the shape of the buttocks, thereby cushioning the force acting on the buttocks to softly receive the force, and improving flexibility/comfort to a greater extent.

Further, the through hole 23 at the center of the front end portion B is positioned at a site in contact with the delicate part of a rider. The large through hole 23 is formed at the site to support the delicate part only by the mesh member 3 high in flexibility. The mesh member 3 high in flexibility supports the delicate part in a hammock-like fashion, thus making it possible to cushion the force acting on the delicate part, softly receive the force and improve flexibility/comfort to a greater extent.

Figure 4:
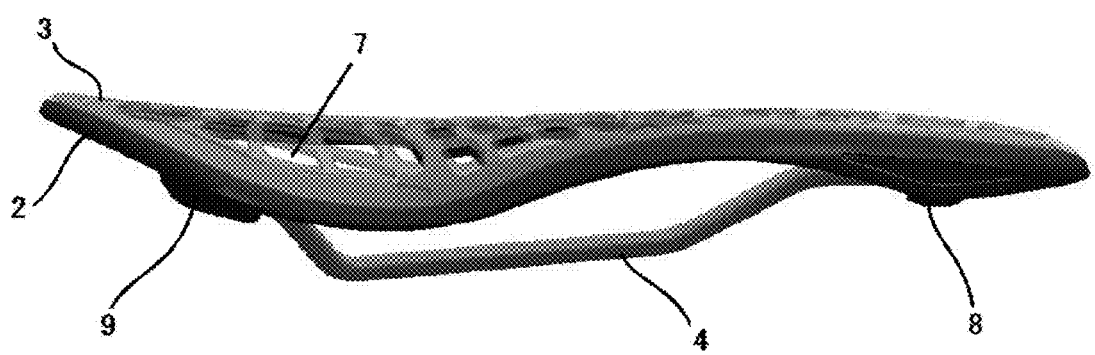
FIG. 4 shows a front view of the bicycle saddle of Embodiment 1.
Figure 5:
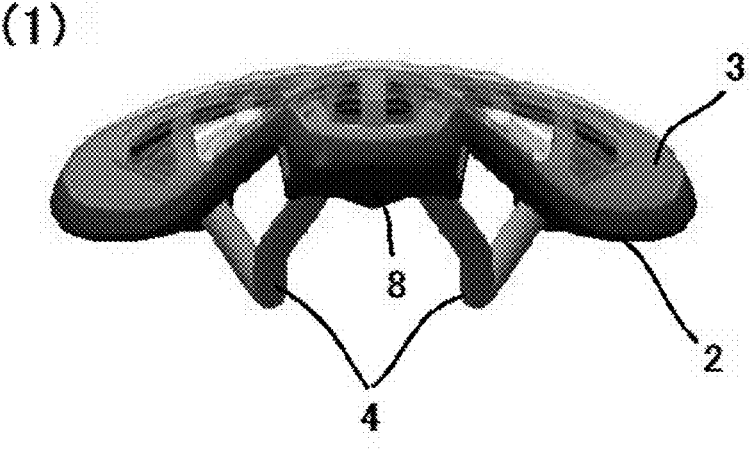
FIG. 5 shows a structure view of the bicycle saddle of Embodiment 1, (1) right side view (2) left side view.
Figure 5:
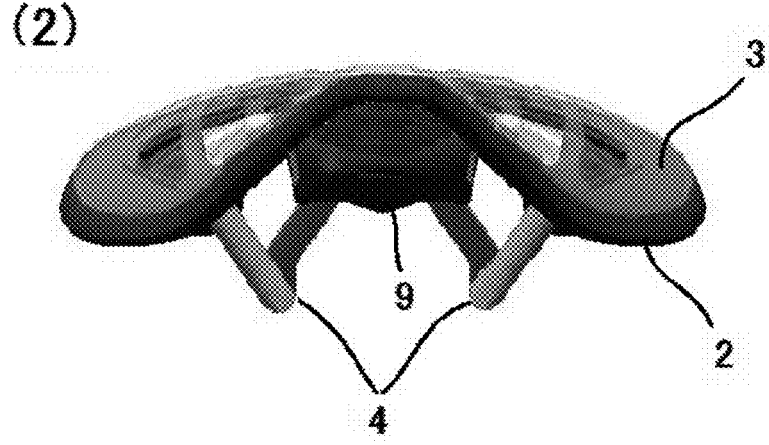

As shown in FIG. 4 and FIG. 5, the frame member and the mesh member of the bicycle saddle in Embodiment 1 are formed in an arch-like shape which gives a slow curve toward an outer circumference as a whole. Further, as shown in FIG. 3, a central part 20 of the rear seat portion is formed in a recessed shape so as to easily deal with elastic deformation of the frame member and the mesh member.

As shown in FIG. 2 and FIG. 3, flat-surface portions free of through holes are formed individually at a leading end 6 of the front end portion and at rear ends on both sides of the rear seat portion. As shown in FIG. 4, leg pieces (8, 9) retaining a pair of rail members 4 by being fitted thereinto are installed in a protruding manner behind the flat-surface portions.

The pair of rail members 4 are formed by bending a metal rod. And, as shown in FIG. 4, they are inserted into the front leg piece 8 and the rear leg piece 9 and fitted into the leg pieces. The pair of rail members 4 are retained by fixing members 11 attached on the bicycle frame 10.

As described above, the bicycle saddle of Embodiment 1 is constituted with the frame member made of a synthetic resin material high in strength/rigidity on which a plurality of through holes are formed and the mesh member made of a synthetic resin material with flexibility which is laminated on an upper face of the frame member and on which a plurality of through holes are formed in a mesh-like manner. As a result, the frame member is provided with the strength/rigidity capable of stably supporting the load of a rider and the mesh member is provided with cushioning properties capable of absorbing impact when the rider takes a ride and softly receives the rider, thereby balancing contrasting elements such as flexibility/comfort and strength/rigidity.

Further, the frame member and the mesh member are integrally formed by using respectively a resin material high in strength/rigidity and a resin material with flexibility by use of insert molding technologies, thus making it possible to drastically reduce the time of manufacturing the saddle main body and cost thereof. Still further, the bicycle saddle can be reduced in weight.

The through holes formed on the frame member and the mesh member can realize high breathability to eliminate such a problem of proliferation of mold and miscellaneous microorganisms due to poor breathability. The saddle main body is less likely to keep heat and, therefore, less likely to be warmed even when left outside on a fine day. Further, the mesh member has the through holes at an entire region, thereby ensuring the breathability of the buttocks and thighs in contact with the mesh member when a rider takes a ride. Thus, when the rider takes a ride for a prolonged period of time or during high summer temperatures, the rider is less likely to feel uncomfortable. Still further, since the mesh member is formed in a hammock-like fashion, it gives a lower load to the rider who takes a ride for a prolonged period of time and is also superior in comfort.

In the bicycle saddle of Embodiment 1, the synthetic resin material of the frame member is given a black smoke color, while that of the mesh member is given a white clear color. The frame member and the mesh member are given mutually different colors, thereby realizing a bicycle saddle superior in design.

Embodiment 2

In the bicycle saddle of Embodiment 2, two synthetic resin materials different in hardness are used to prepare a molded article, and the molded article is used in the frame member of the bicycle saddle in Embodiment 1. A resin material is used, depending on the rigidity required by the front end portion or the rear seat portion of the frame member, or sites of the frame member are divided into a site to which the load is easily applied and a site to which the load has difficulty in being applied when a rider takes a ride, and resin materials depending on the rigidity required by these sites are used to retain the strength/rigidity capable of stably supporting the load of the rider who takes a ride and also to give flexibility/comfort to the rider.

Embodiment 3

In the bicycle saddle of Embodiment 3, two types of synthetic resin materials different in hardness are used to prepare a molded article, and the molded article is used in the mesh member of the bicycle saddle in Embodiment 1 or Embodiment 2. A resin material is used depending on the flexibility required by the front end portion or the rear seat portion of the mesh member, or sites of the frame member are divided into a site to which the load is easily applied and a site to which the load has difficulty in being applied when a rider takes a ride. Resin materials individually depending on the flexibility required are used to retain the strength/rigidity capable of stably supporting the load of the rider who takes a ride and also to give the flexibility/comfort to the rider.

Embodiment 4

Figure 6:
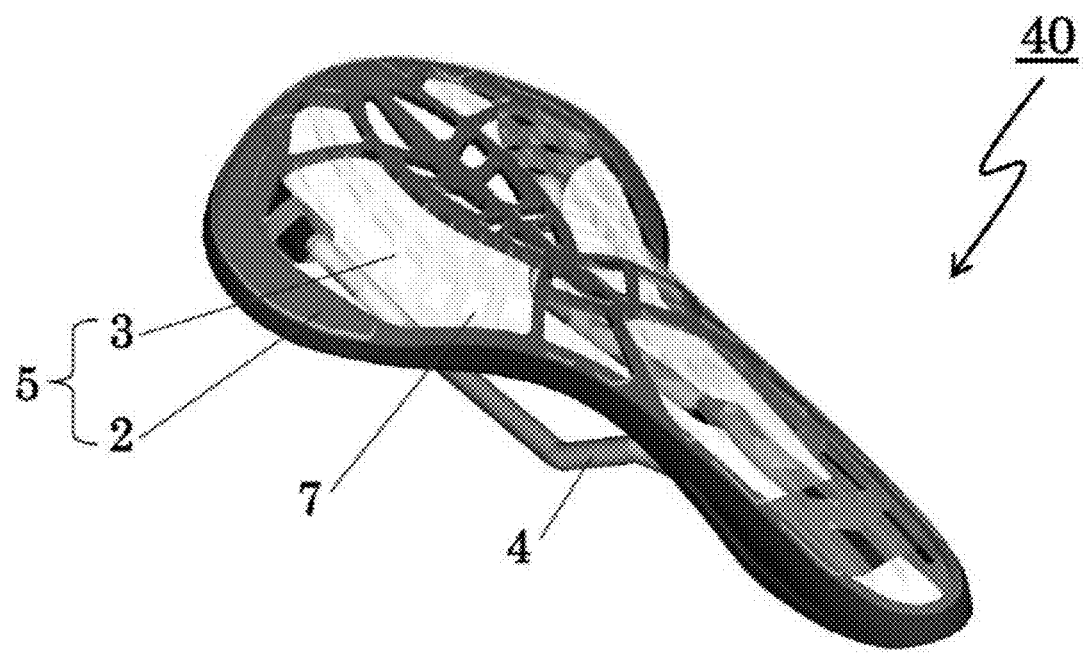
FIG. 6 shows an external perspective view of the bicycle saddle of Embodiment 4.

FIG. 6 shows an external perspective view of the bicycle saddle of Embodiment 4. An entire shape of the bicycle saddle 40 shown in FIG. 6 is composed of a substantially oval-shaped rear seat portion and a long and narrow front end portion projecting forward from the rear seat portion.

The bicycle saddle 40 is constituted with a saddle main body 5 composed of a frame member 2 formed with a hard synthetic resin material and a mesh member 3 formed with a synthetic resin material softer than the resin material of the frame member 2, and a pair of rail members, as shown in FIG. 1 of Embodiment 1, which are attachment members attaching the saddle main body 5 to a bicycle frame.

Same as in Embodiment 1, the frame member 2 is made of glass-fiber reinforced nylon and the mesh member 3 is made of nylon not fiber-reinforced. The glass-fiber reinforced nylon is greater in shore hardness than the nylon not fiber-reinforced.

Figure 7:
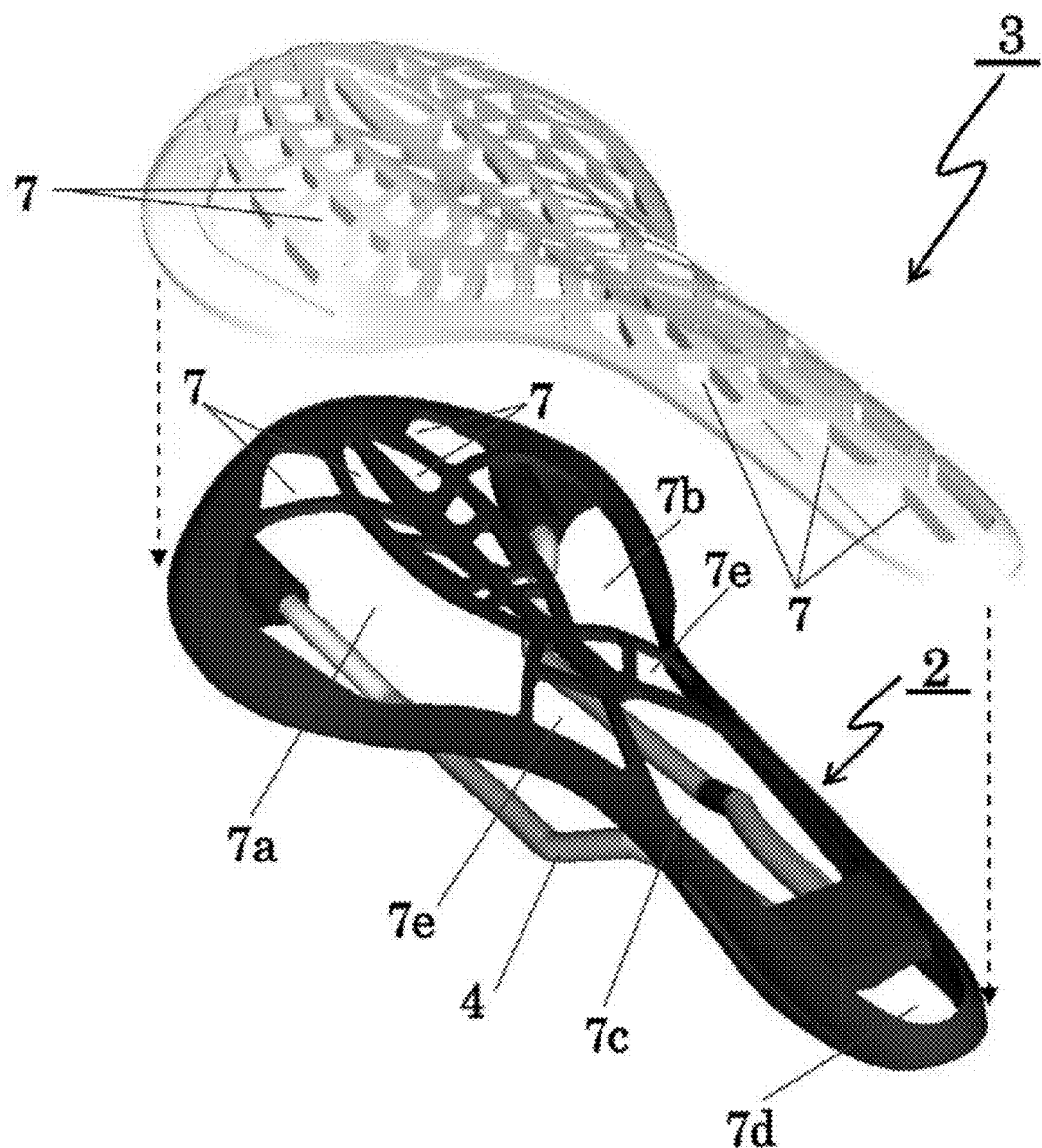
FIG. 7 shows an explanatory view of the structure of the frame member and the mesh member of the bicycle saddle of Embodiment 4.

Each of the frame member 2 and the mesh member 3 is provided with a plurality of through holes 7. Each of the through holes of the members is substantially different in terms of arrangement, shape and size. As shown in FIG. 7, the through holes 7 of the mesh member 3 are arranged almost all over a region so as to be symmetrical in a mesh-like fashion. On the other hand, as shown in FIG. 7, most of the through holes of the frame member 2 are greater in opening area than the through holes of the mesh member 3. The through holes (7a, 7b, 7c) are greater in opening area by 4 to 6 times than the through holes of the mesh member 3. In particular, the through holes (7a, 7b) are greater than the through holes (7a, 7b) of Embodiment 1 and are greater in opening area by 5 to 6 times than the through holes of the mesh member 3. The through holes of the frame member 2 are, as with those of the mesh member 3, arranged almost all over a region so as to be symmetrical. The through holes (7c, 7d) formed at the front end portion are one symmetrical hole.

Figure 8:
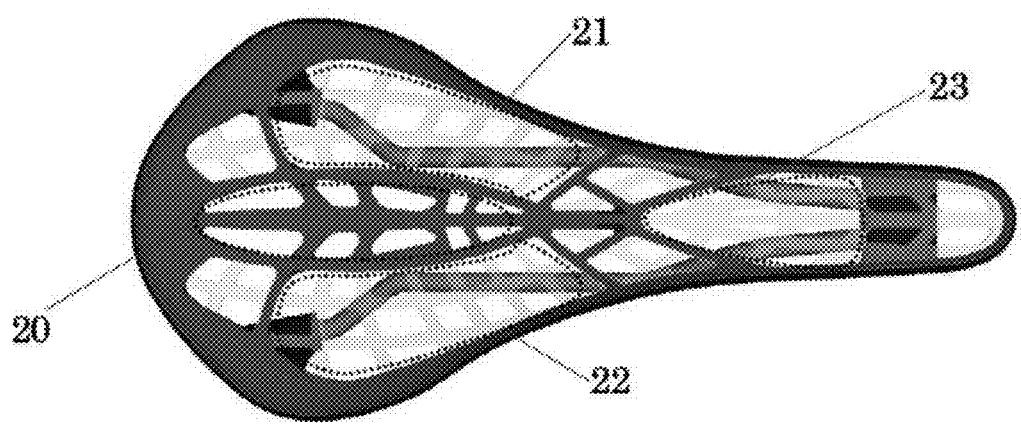
FIG. 8 shows a structure view of the bicycle saddle of Embodiment 4, (1) plan view, (2) bottom view.
Figure 8:
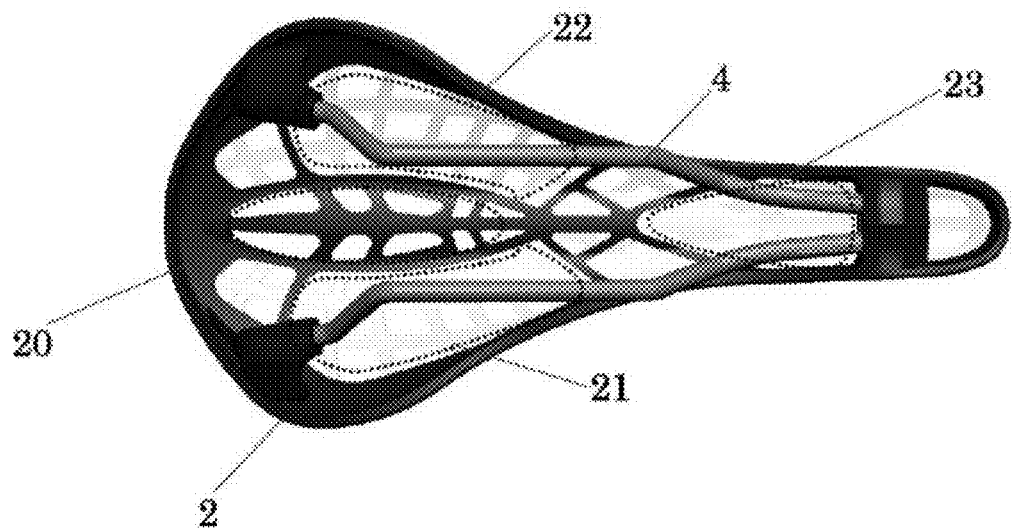

FIG. 8(1) shows a plan view of the bicycle saddle of Embodiment 4. FIG. 8(2) shows a bottom view of the bicycle saddle of Embodiment 4.

As shown in FIG. 8(1), (2), the frame member is provided with a pair of through holes (21, 22) on both sides of the rear seat portion A and a through hole 23 at the center of the front end portion. These three through holes (21, 22 and 23) are greater in opening area by 4 to 6 times than other through holes. Further, the through holes are formed at a region accounting for 70% to 80% of a total area of the frame member.

Regarding the through holes of the mesh member 3, rectangular through holes different in size are arrayed at the rear seat portion so as to be concentric in a radial manner from the center of the rear seat portion, thereby forming a spider's web-like mesh structure. Further, long holes are formed at the front end portion so as to be placed side by side in the longitudinal direction.

Further, the two through holes (21, 22) on both sides of the rear seat portion are positioned at sites most frequently in contact with the fleshy part of the buttocks of a rider. The large through holes (21, 22) are formed at the sites, thus making it possible to support most of the fleshy part of the buttocks only by the mesh member 3 high in flexibility. The mesh member 3 high in flexibility supports the fleshy part of the buttocks in a hammock-like fashion, by which the mesh member is able to quickly conform to the shape of the buttocks, thereby cushioning the force acting on the buttocks to softly receive the force, and improving flexibility/comfort to a greater extent.

Further, the through hole 23 at the center of the front end portion is positioned at a site in contact with the delicate part of a rider. The large through hole 23 is formed at the site to support the delicate part only by the mesh member 3 high in flexibility. The mesh member 3 high in flexibility supports the delicate part in a hammock-like fashion, thus making it possible to cushion the force acting on the delicate part, softly receive the force and improve flexibility/comfort to a greater extent.

As same as Embodiment 1, the frame member and the mesh member of the bicycle saddle in Embodiment 4 are formed in an arch-like shape which gives a slow curve toward an outer circumference as a whole. Further, as shown in FIG. 8, a central part 20 of the rear seat portion is formed in a recessed shape so as to easily deal with elastic deformation of the frame member and the mesh member.

As described above, the bicycle saddle of Embodiment 4 is constituted with the frame member made of a synthetic resin material high in strength/rigidity on which a plurality of through holes are formed and the mesh member made of a synthetic resin material with flexibility which is laminated on an upper face of the frame member and on which a plurality of through holes are formed in a mesh-like manner. As a result, the frame member is provided with the strength/rigidity capable of stably supporting the load of a rider and the mesh member is provided with cushioning properties capable of absorbing impact when the rider takes a ride and softly receives the rider, thereby balancing contrasting elements such as flexibility/comfort and strength/rigidity.

Further, as same as Embodiment 1, the frame member and the mesh member of the bicycle saddle of Embodiment 4 are integrally formed by using respectively a resin material high in strength/rigidity and a resin material with flexibility by use of insert molding technologies, thus making it possible to drastically reduce the time of manufacturing the saddle main body and cost thereof.

As same as Embodiment 1, in the bicycle saddle of Embodiment 4, the synthetic resin material of the frame member is given a black smoke color, while that of the mesh member is given a white clear color. The frame member and the mesh member are given mutually different colors, thereby realizing a bicycle saddle superior in design.

Figure 9:
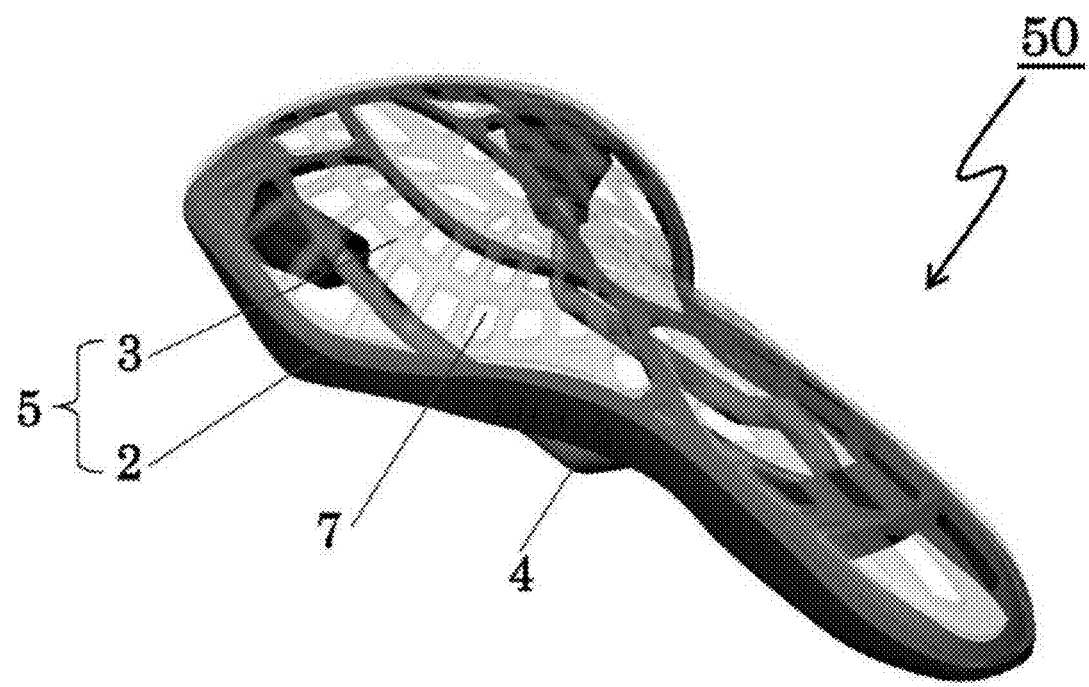
FIG. 9 shows an external perspective view of the bicycle saddle of Embodiment 5.

FIG. 9 shows an external perspective view of the bicycle saddle of Embodiment 5. An entire shape of the bicycle saddle 50 shown in FIG. 9 is composed of a substantially oval-shaped rear seat portion and a long and narrow front end portion projecting forward from the rear seat portion.

The bicycle saddle 50 is constituted with a saddle main body 5 composed of a frame member 2 formed with a hard synthetic resin material and a mesh member 3 formed with a synthetic resin material softer than the resin material of the frame member 2, and a pair of rail members, as shown in FIG. 1 of Embodiment 1, which are attachment members attaching the saddle main body 5 to a bicycle frame.

As same as Embodiment 1, the frame member 2 is made of glass-fiber reinforced nylon and the mesh member 3 is made of nylon not fiber-reinforced. The glass-fiber reinforced nylon is greater in shore hardness than the nylon not fiber-reinforced.

Figure 10:
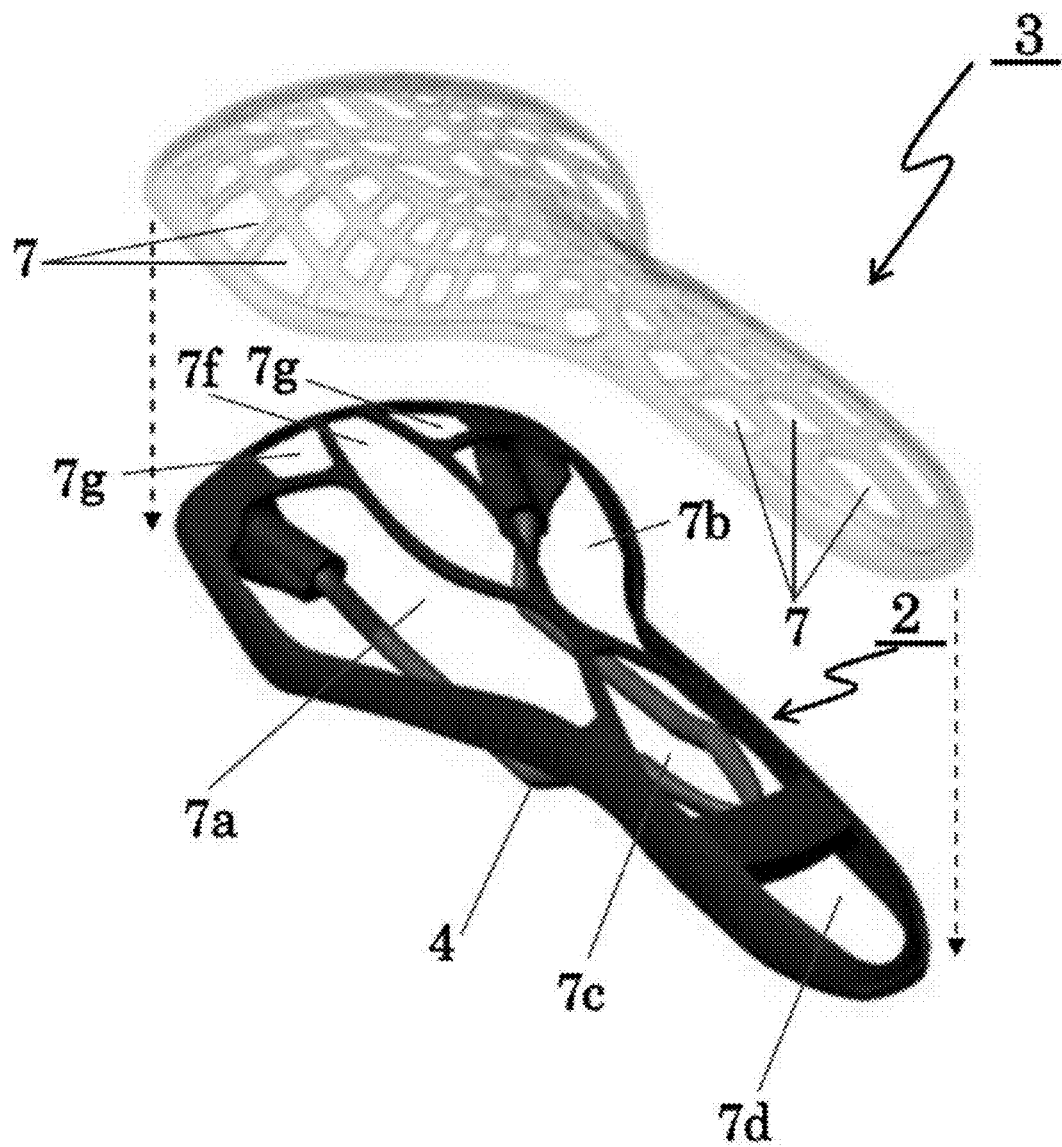
FIG. 10 shows an explanatory view of the structure of the frame member and the mesh member of the bicycle saddle of Embodiment 5.

Each of the frame member 2 and the mesh member 3 is provided with a plurality of through holes 7. Each of the through holes of the members is substantially different in terms of arrangement, shape and size. As shown in FIG. 10, the through holes 7 of the mesh member 3 are arranged almost all over a region so as to be symmetrical in a mesh-like fashion. On the other hand, as shown in FIG. 10, most of the through holes of the frame member 2 are greater in opening area than the through holes of the mesh member 3. The through holes (7a, 7b, 7c and 7f) are greater in opening area by 4 to 6 times than the through holes of the mesh member 3. In particular, the through holes (7a, 7b) are greater than the through holes (7a, 7b) of Embodiment 1 and 4. The through holes (7a, 7b) are greater in opening area by 6 to 8 times than the through holes of the mesh member 3. Further, the through hole 7f is the through holes of Embodiment 1 and 4. The through hole 7f is greater in opening area by 7 to 8 times than the through holes of the mesh member 3. The through hole 7f is a through hole together a plurality of through holes of the same site of Embodiment 1 and 4. The through holes (7c, 7d) formed at the front end portion are one symmetrical hole.

Figure 11:
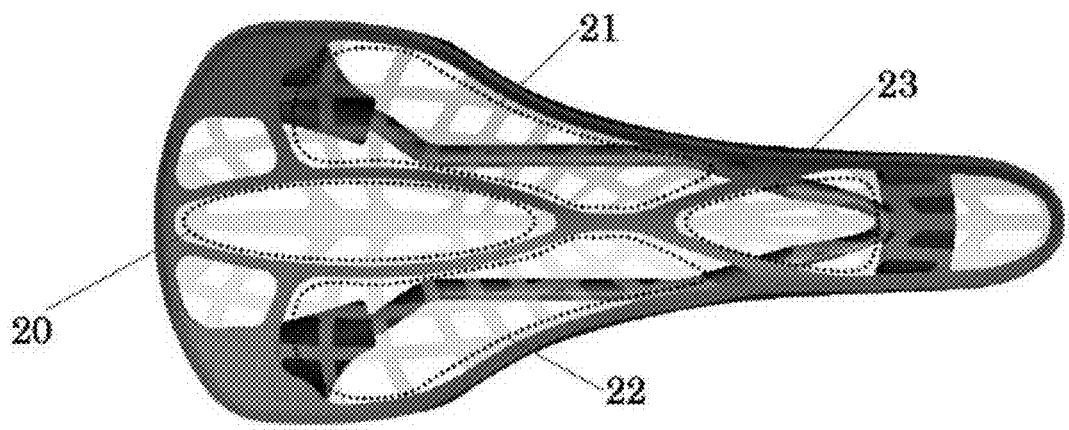
FIG. 11 shows a structure view of the bicycle saddle of Embodiment 5, (1) plan view, (2) bottom view.
Figure 11:
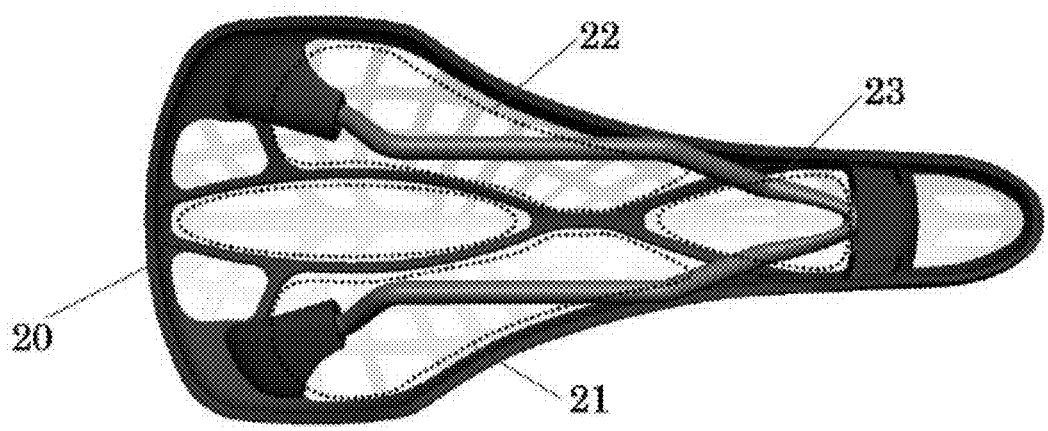

FIG. 11(1) shows a plan view of the bicycle saddle of Embodiment 5. FIG. 11(2) shows a bottom view of the bicycle saddle of Embodiment 5.

As shown in FIG. 11(1), (2), the frame member is provided with a pair of through holes (21, 22) on both sides of the rear seat portion and a through hole 23 at the center of the front end portion. These three through holes (21, 22 and 23) are greater in opening area by 4 to 6 times than other through holes. Further, the through holes are formed at a region accounting for 70% to 80% of a total area of the frame member. The central portion 20 of the rear seat portion, unlike from Embodiment 1 and 4, is one of the through holes in the frame members. The central portion 20 of the rear seat portion is formed in a recessed shape and is characterized by being formed of the mesh member.

Regarding the through holes of the mesh member 3, rectangular through holes different in size are arrayed at the rear seat portion so as to be concentric in a radial manner from the center of the rear seat portion, thereby forming a spider's web-like mesh structure. Further, long holes are formed at the front end portion so as to be placed side by side in the longitudinal direction.

Further, the two through holes (21, 22) on both sides of the rear seat portion are positioned at sites most frequently in contact with the fleshy part of the buttocks of a rider. The large through holes (21, 22) are formed at the sites, thus making it possible to support most of the fleshy part of the buttocks only by the mesh member 3 high in flexibility. The mesh member 3 high in flexibility supports the fleshy part of the buttocks in a hammock-like fashion, by which the mesh member is able to quickly conform to the shape of the buttocks, thereby cushioning the force acting on the buttocks to softly receive the force, and improving flexibility/comfort to a greater extent.

Further, the through hole 23 at the center of the front end portion is positioned at a site in contact with the delicate part of a rider. The large through hole 23 is formed at the site to support the delicate part only by the mesh member 3 high in flexibility. The mesh member 3 high in flexibility supports the delicate part in a hammock-like fashion, thus making it possible to cushion the force acting on the delicate part, softly receive the force and improve flexibility/comfort to a greater extent.

As same as Embodiments 1 and 4, the frame member and the mesh member of the bicycle saddle in Embodiment 5 are formed in an arch-like shape which gives a slow curve toward an outer circumference as a whole.

As described above, the bicycle saddle of Embodiment 5 is constituted with the frame member made of a synthetic resin material high in strength/rigidity on which a plurality of through holes are formed and the mesh member made of a synthetic resin material with flexibility which is laminated on an upper face of the frame member and on which a plurality of through holes are formed in a mesh-like manner. As a result, the frame member is provided with the strength/rigidity capable of stably supporting the load of a rider and the mesh member is provided with cushioning properties capable of absorbing impact when the rider takes a ride and softly receives the rider, thereby balancing contrasting elements such as flexibility/comfort and strength/rigidity.

Further, as same as Embodiment 1, the frame member and the mesh member of the bicycle saddle in Embodiment 5 are integrally formed by using respectively a resin material high in strength/rigidity and a resin material with flexibility by use of insert molding technologies, thus making it possible to drastically reduce the time of manufacturing the saddle main body and cost thereof.

The bicycle saddle of Embodiment 5, the frame members to be used, as the minimum volume for shape retention, thereby realizing to be reduced in weight of the entire saddle.

As same as Embodiments 1 and 4, in the bicycle saddle of Embodiment 5, the synthetic resin material of the frame member is given a black smoke color, while that of the mesh member is given a white clear color. The frame member and the mesh member are given mutually different colors, thereby realizing a bicycle saddle superior in design.

Other Embodiments (1) The bicycle saddle of the present invention shall not be limited to the above-described embodiments. In the above-described embodiments, the through holes of the rear seat portion of the mesh member are arrayed so as to give a spider's web-like mesh structure. It is acceptable that the through holes are formed in an irregular manner. It is also acceptable that the through holes are densely formed at a part which requires cushioning properties and elastic deformation, while they are sparsely formed at the other parts.

(2) In said embodiments, the mesh member is substantially similar in entire shape to the frame member. It is, however, acceptable that the frame member in its entirety is notched partially, for example, notched at a front leading end and at a rear end thereof.

INDUSTRIAL APPLICABILITY

The present invention is useful for a bicycle saddle of a racing or a portable.

DESCRIPTION OF SYMBOLS 1, 40, 50 Bicycle saddle
2 Frame member
3 Mesh member
4 Rail member
5 Saddle main body
6 Leading end of the front end portion
7, 7a, 7b, 7c, 7d, 7e, 7f, 7g Through hole
8 Front leg piece
9 Rear leg piece
10 Bicycle frame
11 Fixing member
20 Central part
21, 22 Through hole on both sides of the rear seat portion
23 Through hole at the center of the front end portion
A Rear seat portion
B Front end portion

What is claimed is:

1. A bicycle saddle which comprises a saddle main body and a rail member for attaching the saddle main body to a bicycle frame,
    in which the saddle main body includes a frame member made of a first synthetic resin on which a plurality of through holes are formed and a mesh member made of a second synthetic resin which is laminated on an upper face of the frame member and on which a plurality of through holes are formed in a mesh-like manner, wherein
    a pair of through holes on both sides of a rear seat portion which are the through holes of the frame member are larger in opening area by 3 times or more than the through holes of the mesh member, and
    an opening area of the through holes of the frame member accounts for 50% or more of a total area, and an opening area of the through holes of the mesh member accounts for 30% to 50% of a total area thereof, and the opening area of the through holes of the mesh member is ⅓ to ⅙ times of each of an opening area of a pair of through holes, on both sides of the rear seat portion, of the frame member, and
    the second synthetic resin is a synthetic resin material lower in rigidity than the first synthetic resin, and
    the whole of the frame member and the mesh member are integrally formed with resin materials different respectively in hardness, and the mesh member is bonded to the entire surface of the frame member.

2. The bicycle saddle according to claim 1, wherein a pair of through holes on both sides of a rear seat portion which are the through hole of the frame member are 4 to 6 times greater in opening area than the through holes of the mesh member, and the through holes are formed at a region which accounts for 70% to 80% of a total area of the frame member.

3. The bicycle saddle according to claim 1, wherein the frame member includes a rear seat portion and a long and narrow front end portion protruding forward from the rear seat portion,
    the pair of through holes on both sides of the rear seat portion and the through hole substantially at the center of the front end portion are larger in opening area by 3 times or more than other through holes, and
    the through holes of the mesh member are arrayed so as to be concentric in a radial manner from the center of the rear seat portion, thereby forming a spider's web-like mesh structure.

4. The bicycle saddle according to claim 1, wherein each of the frame member and the mesh member includes a rear seat portion and a long and narrow front end portion which protrudes forward from the rear seat portion, formed in an arch-like shape which gives a slow curve toward an outer circumference and also formed so as to be recessed at the center of the rear seat portion, with each of the outer circumferences being substantially the same.

5. The bicycle saddle according to claim 1, wherein a resin material of the first synthetic resin is different in color from a resin material of the second synthetic resin.

6. The bicycle saddle according to claim 1, wherein
    the rail member is a hard wire-like member which is fitted into leg pieces installed consecutively at a front end and a rear end of the frame member, and
    a recessed portion of the leg piece is made of a soft material with shock absorption.

7. The bicycle saddle according to claim 1, wherein
    the second synthetic resin of the mesh member is a synthetic resin selected from nylon, polyethylene, polypropylene and polycarbonate, and the first synthetic resin of the frame member is a synthetic resin obtained by reinforcing the second synthetic resin with glass-fiber or carbon fiber or both.

8. The bicycle saddle according to claim 1, wherein
    the frame member is a molded article made of at least two types of synthetic resin materials different in hardness, or
    the mesh member is a molded article made of at least two types of synthetic resin materials different in hardness, or both.

9. The bicycle saddle according to claim 8, wherein synthetic resin materials different in hardness are different in color from each other.

10. A bicycle saddle which comprises a saddle main body and a rail member for attaching the saddle main body to a bicycle frame,
    in which the saddle main body includes a frame member made of a first synthetic resin on which a plurality of through holes are formed and a mesh member made of a second synthetic resin which is laminated on an upper face of the frame member and on which a plurality of through holes are formed in a mesh-like manner, wherein
    a pair of through holes on both sides of a rear seat portion which are the through holes of the frame member are larger in opening area by 3 times or more than the through holes of the mesh member, and an opening area of the through holes of the mesh member accounts for 30% to 50% of a total area thereof, and the opening area of the through holes of the mesh member is ⅓ to ⅙ times of each of an opening area of a pair of through holes, on both sides of the rear seat portion, of the frame member, and
    an opening area of the through holes of the frame member accounts for 60% to 70% a total area, and
    the second synthetic resin is a synthetic resin material lower in rigidity than the first synthetic resin, and
    the whole of the frame member and the mesh member are integrally formed with resin materials different respectively in hardness, and the mesh member is bonded to the entire surface of the frame member.

11. The bicycle saddle according to claim 10, wherein each of the frame member and the mesh member includes a rear seat portion and a long and narrow front end portion which protrudes forward from the rear seat portion, formed in an arch-like shape which gives a slow curve toward an outer circumference and also formed so as to be recessed at the center of the rear seat portion, with each of the outer circumferences being substantially the same.

12. The bicycle saddle according to claim 10, wherein a resin material of the first synthetic resin is different in color from a resin material of the second synthetic resin.

13. The bicycle saddle according to claim 10, wherein
the rail member is a hard wire-like member which is fitted into leg pieces installed consecutively at a front end and a rear end of the frame member, and
a recessed portion of the leg piece is made of a soft material with shock absorption.

14. The bicycle saddle according to claim 10, wherein
the second synthetic resin of the mesh member is a synthetic resin selected from nylon, polyethylene, polypropylene and polycarbonate.

15. The bicycle saddle according to claim 10, wherein
the first synthetic resin of the frame member is a synthetic resin obtained by reinforcing the second synthetic resin with glass-fiber or carbon fiber or both.

16. The bicycle saddle according to claim 10, wherein
the frame member is a molded article made of at least two types of synthetic resin materials different in hardness.

17. The bicycle saddle according to claim 16, wherein at least two types of synthetic resin materials different in hardness are also different in color from each other.

18. The bicycle saddle according to claim 10, wherein
the mesh member is a molded article made of at least two types of synthetic resin materials different in hardness.

19. The bicycle saddle according to claim 18, wherein at least two types of synthetic resin materials different in hardness are also different in color from each other.

* * * * *